Patented Nov. 19, 1929

1,736,061

UNITED STATES PATENT OFFICE

WILLY TRAUTNER, BERTHOLD STEIN, AND ROBERT BERLINER, OF ELBERFELD, GERMANY, ASSIGNORS TO GENERAL ANILINE WORKS, INC., OF NEW YORK, N. Y., A CORPORATION OF DELAWARE

PROCESS OF MAKING 1-PHENYL-BENZANTHRONE COMPOUNDS

No Drawing. Application filed September 16, 1926, Serial No. 135,990, and in Germany November 23, 1925.

Our invention provides for a novel and convenient method of making 1-phenyl-benzanthrone compounds.

We have shown in our co-pending application Serial No. 135,984 filed on even date, that cinnamic aldehyde compounds condense in nonalkaline medium with anthrone compounds to form cinnamylidene-anthrones of the general formula:

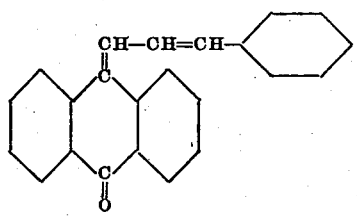

We have further shown in our co-pending application Serial No. 135,989 filed on even date, that by heating these cinnamylidene-anthrone compounds to temperatures of about 250° C. an intramolecular condensation takes place with formation of novel 1-phenyl-benzanthrone compounds of the probable formula:

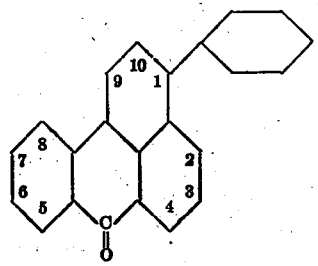

which are usually yellow colored, crystalline substances, dissolving in concentrated sulfuric acid with characteristic, reddish colors.

We have now found that the 1-phenyl-benzanthrone compounds can be obtained directly from anthrone and cinnamic aldehyde compounds. To this effect mixtures of the anthrone compound and cinnamic aldehyde are slowly heated to temperatures of about 200–300° C., the cinnamylidene-anthrones are most likely formed as intermediate compounds and condense under these conditions to the corresponding 1-phenyl-benzanthrone compounds. It is in this procedure also of advantage in certain instances to add to the reaction mixture an acidic condensing agent, or to perform the reaction in a high boiling solvent. As such acidic condensing agents which were found particularly useful we might mention phosphorous oxychloride, zinc chloride, acetic anhydrid, etc. The 1-phenyl-benzanthrone compounds obtained in this manner are substantially identical with those obtained by heating the isolated cinnamylidene-anthrones.

The following examples will further illustrate our invention, the parts being by weight:

*Example 1.*—19 parts anthrone and 13 parts cinnamic aldehyde are heated to 120° C. until clear solution is obtained. 0.12 parts phosphorous-oxychloride are now added to this solution and the temperature gradually increased to 300° C; the reaction is interrupted after no more intermediate cinnamylidene-anthrone can be detected in the melt. The 1-phenyl-benzanthrone formed is isolated from the melt in the usual manner. It is obtained after purification as yellow needles, melting at 181° C., dissolving in concentrated sulfuric acid with a red color. It has most probably the formula:

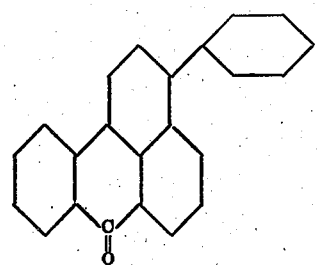

and is identical with the 1-phenyl-benzanthrone obtained in Example 1 of our application Serial No. 135,989 of even date. The yield is about 30–35% of theory.

*Example 2.*—9.7 parts anthrone and 7 parts cinnamic aldehyde are heated to the boiling point with 3.5 parts alpha-chloronaphthalene in such a manner that the water formed during the reaction is not returned to the reaction. The reaction is finished after about one hour's heating. The cold melt is then run into about 18 parts alcohol. The 1-phenyl-benzanthrone formed separates as yellow needles; it is filtered off, washed with alcohol and dried. It is identical with the product obtained in Example 1. The yield is about 30–35% of theory.

*Example 3.*—5.2 parts alpha-hydroxy-anthrone of the formula:

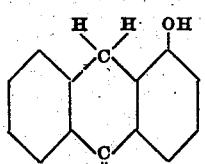

or of the isomeric formula:

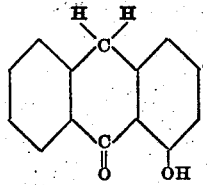

3.5 parts cinnamic aldehyde and 0.5 parts zinc chloride are gradually heated, whilst stirring, to about 280° C. The reaction is interrupted as soon as a sample of the melt dissolves in concentrated sulfuric acid with a reddish-orange color, showing strong fluorescence. The melt is then stirred up with methanol whereby it solidifies. It is then crystallized from pyridine and yellow needles of 1-phenyl-alpha-hydroxy-benzanthrone are obtained.

*Example 4.*—A suspension of 19 parts anthrone, 14 parts cinnamic aldehyde, 2 parts potassium acetate and 10 parts acetic anhydrid are heated in an open vessel until a temperature of about 290° C. is obtained. The melt is then stirred up with 150 parts hot alcohol, filtered off cold, the residue boiled up with diluted aqueous alcohol and the solidified resinous product rubbed on with acetone. Yellow needles of 1-phenyl-benzanthrone are so obtained with a yield of about 30%.

*Example 5.*—A mixture of 2.8 parts beta-chloro-anthrone of the formula:

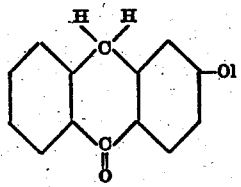

or of the isomeric formula:

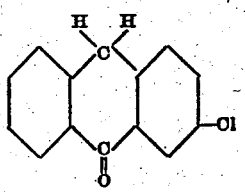

1.8 parts cinnamic aldehyde and 1.5 parts alpha-chloro-naphthalene are slowly heated, a little phosphorous oxychloride is added drop by drop and finally the reaction mass is brought to boiling temperature. The reaction is allowed to cool as soon as a sample dissolves in concentrated sulfuric acid with the bluish-red, fluorescent color characteristic for the 1-phenyl-beta-chloro-benzanthrone. The so obtained dark resinous product is rubbed on with methanol, it solidifies after some standing. After extracting it with acetone light yellow needles of 1-phenyl-beta-chloro-benzanthrone are obtained with a yield of about 10–20% of theory.

We claim:

1. The process of producing 1-phenyl-benzanthrone compounds which consists in heating mixtures of anthrone compounds and cinnamic aldehyde to temperatures of about 200–300° C.

2. The process of producing 1-phenyl-benzanthrone compounds which consists in heating mixtures of anthrone compounds and cinnamic aldehyde in presence of an acidic condensing agent to temperatures of about 200–300° C.

3. The process of producing 1-phenyl-benzanthrone compounds which consists in heating mixtures of anthrone compounds and cinnamic aldehyde in presence of an acidic condensing agent and a high boiling solvent to temperatures of about 200–300° C.

4. The process of producing 1-phenyl-benzanthrone which consists in heating a mixture of anthrone and cinnamic aldehyde to temperatures of about 200–300° C.

5. The process of producing 1-phenyl-benzanthrone which consists in heating a mixture of anthrone and cinnamic aldehyde in presence of an acidic condensing agent to temperatures of about 200–300° C.

In testimony whereof we have hereunto set our hands.

WILLY TRAUTNER.
BERTHOLD STEIN.
ROBERT BERLINER.